April 25, 1933. L. O. GRANGE 1,905,463
VULCANIZER
Filed Nov. 11, 1930 5 Sheets-Sheet 1

INVENTOR
LEO O. GRANGE.
BY
ATTORNEYS.

April 25, 1933. L. O. GRANGE 1,905,463
VULCANIZER
Filed Nov. 11, 1930 5 Sheets-Sheet 2
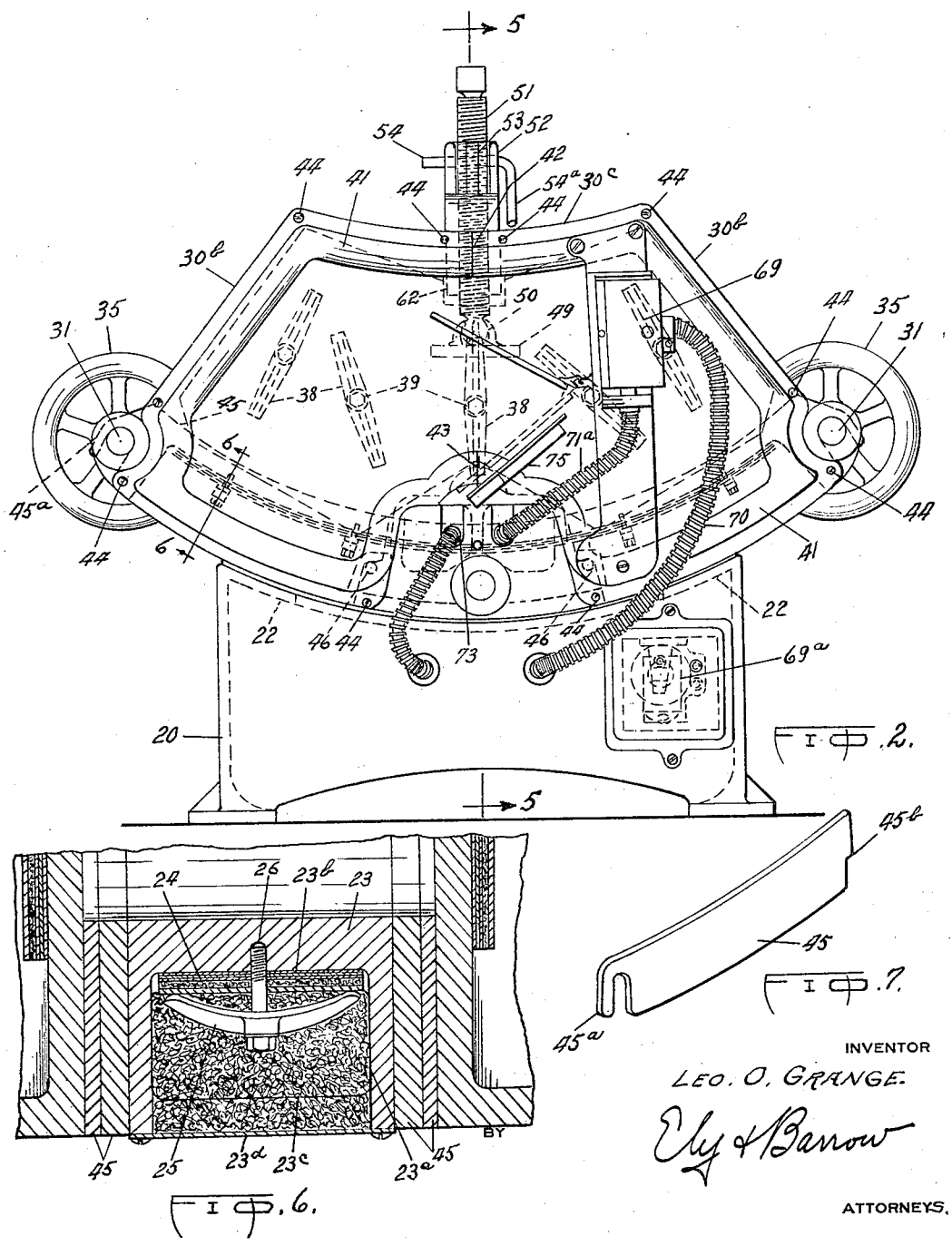
INVENTOR
LEO. O. GRANGE.
ATTORNEYS.

April 25, 1933. L. O. GRANGE 1,905,463
VULCANIZER
Filed Nov. 11, 1930 5 Sheets-Sheet 3

INVENTOR
LEO O. GRANGE.
BY Ely Barrow
ATTORNEYS.

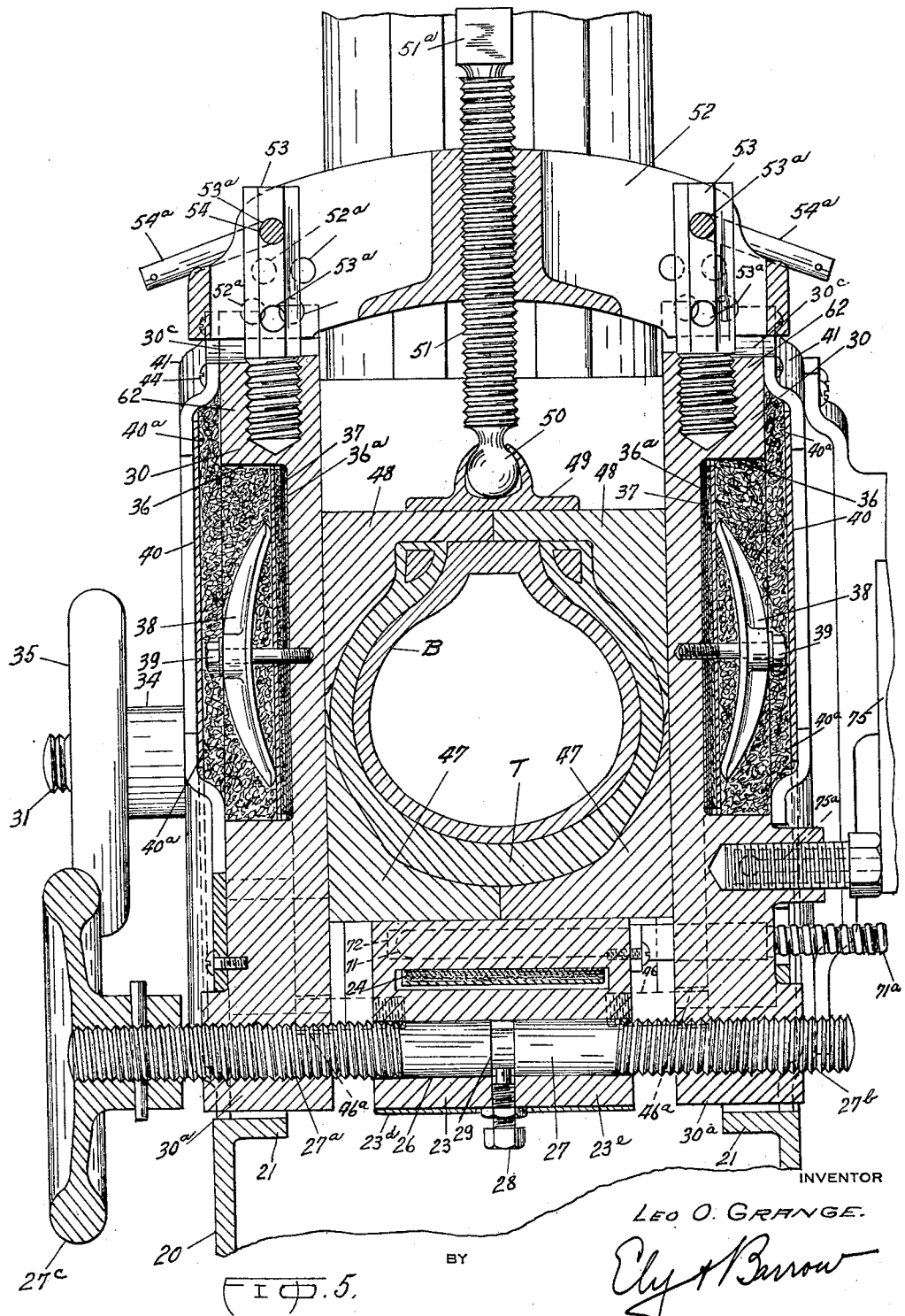

April 25, 1933. L. O. GRANGE 1,905,463
VULCANIZER
Filed Nov. 11, 1930 5 Sheets-Sheet 5
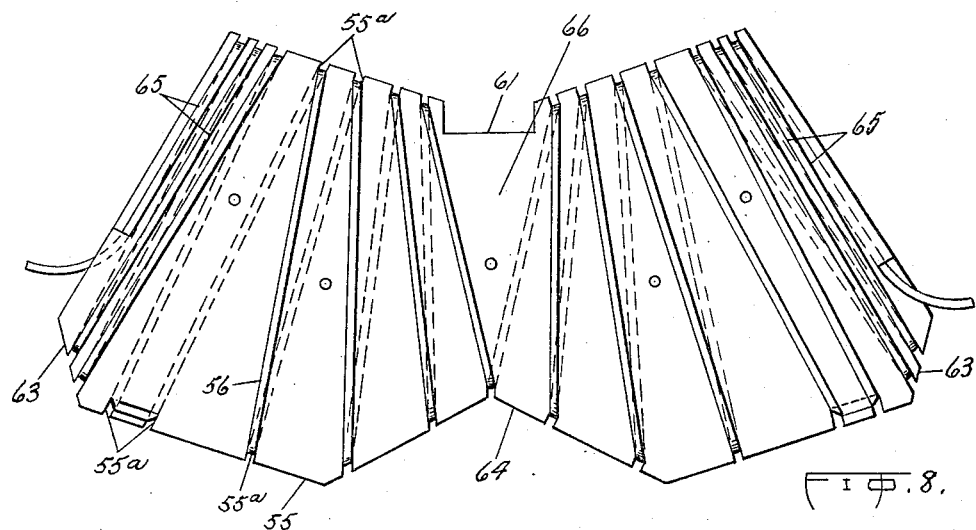
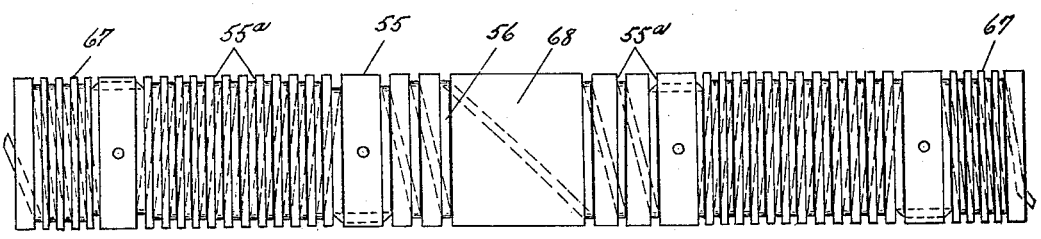
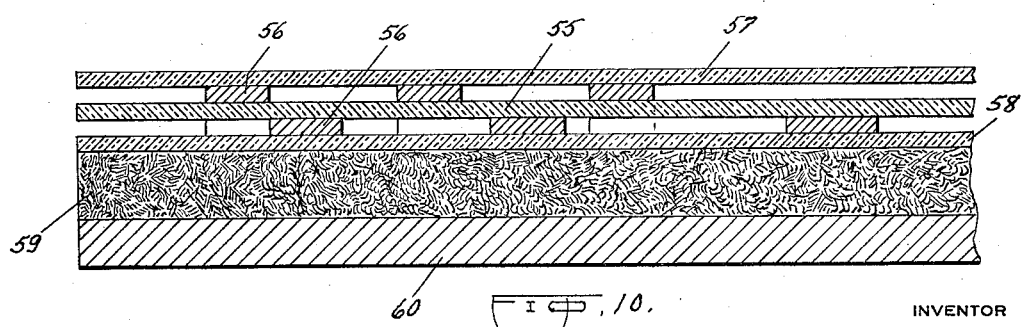
INVENTOR
LEO O. GRANGE.
BY
ATTORNEYS.

Patented Apr. 25, 1933

1,905,463

UNITED STATES PATENT OFFICE

LEO O. GRANGE, OF CHICAGO, ILLINOIS, ASSIGNOR TO WALTER J. JARRATT, OF CHICAGO, ILLINOIS

VULCANIZER

Application filed November 11, 1930. Serial No. 494,881.

This invention relates to vulcanizers and particularly to electrically heated vulcanizers.

Heretofore, vulcanizers, such as used for vulcanizing or repairing tires, have been heated by steam or other fluids circulated through chambers in the mold or in a chamber about the mold. While electrical energy has been utilized commercially to heat these fluids, electrical energy has not been employed as a direct source of heat in commercial vulcanizers, with the exception of more or less flat heating plates such as are used in the vulcanization of small tire or tube repairs.

The advantage of the heated fluid methods is, of course, its ability by reason of circulation to maintain a uniform curing temperature in all parts of the mold. Heretofore, it has not been possible to obtain in a vulcanizer, such as a tire repair vulcanizer, by direct use of electrical energy a uniform distribution and accurate control of heat such as would be practical for commercial operation.

The disadvantages of the heated fluid constructions are slowness in heating up to vulcanizing temperature, energy losses in the heating of the medium and then utilizing the medium to heat the mold walls, and also due to the scale and corrosion accumulated on the walls of the mold jacket, the necessity of periodic fillings and venting, and danger of damage to molds and work from low water or lack of water. These, however, have heretofore been outweighed by the advantage of uniform distribution of heat which has not been obtainable in direct curing devices.

It has been discovered that the difficulty with the prior suggested forms of direct curing electric vulcanizers has been that in the proposed vulcanizers of this type, it has been attempted to adapt known types of resistance heating units to known types of vulcanizers without taking into consideration the factors essential to effective heat distribution and control, i. e., the prior efforts having been directed toward supplying the old types of heating elements for more or less standard forms of vulcanizing molds instead of redesigning both the heating elements and the molds in correlation so as to secure the desired results.

It is the general purpose of the present invention to provide a vulcanizer of the direct cure type in which the heating elements and the vulcanizer members are so correlated as to secure uniform heat distribution.

It is a further purpose of the invention to provide means for associating the heating elements with the vulcanizer members so that heat losses will be reduced to a minimum.

It is a further purpose of the invention to provide means associated with said vulcanizer for the effective control of the heat so that the required vulcanizing temperature will be maintained and also so that injury to the work will be avoided should excessive temperatures occur or should one or more of the heating elements burn out.

It is a further purpose of the invention to provide a tire repair vulcanizer of the direct cure type which may be readily adjusted for different sizes of tires without affecting the even distribution of the heat therein.

It is a further purpose of the invention to provide features of adjustment in a tire repair vulcanizer which may be effective in other than direct cure equipment.

The foregoing and other purposes of the invention are attained in the vulcanizer illustrated in the accompanying drawings and described below. It is to be understood that the invention is not limited to the specific form thereof which is shown and described.

Of the accompanying drawings:

Figure 2 is the other side elevation thereof;

Figure 5 is an enlarged section on line 5—5 of Figure 2 and showing a tire in place in the vulcanizer;

Figure 6 is a section on line 6—6 of Figure 2;

Figure 7 is a perspective view of a spacer;

Figures 8 and 9 are elevations, respectively, of the side and bottom heating elements;

Figure 10 is a magnified section through a portion of a heating element, its insulating backing and its pressure plate.

Figures 1, 11:
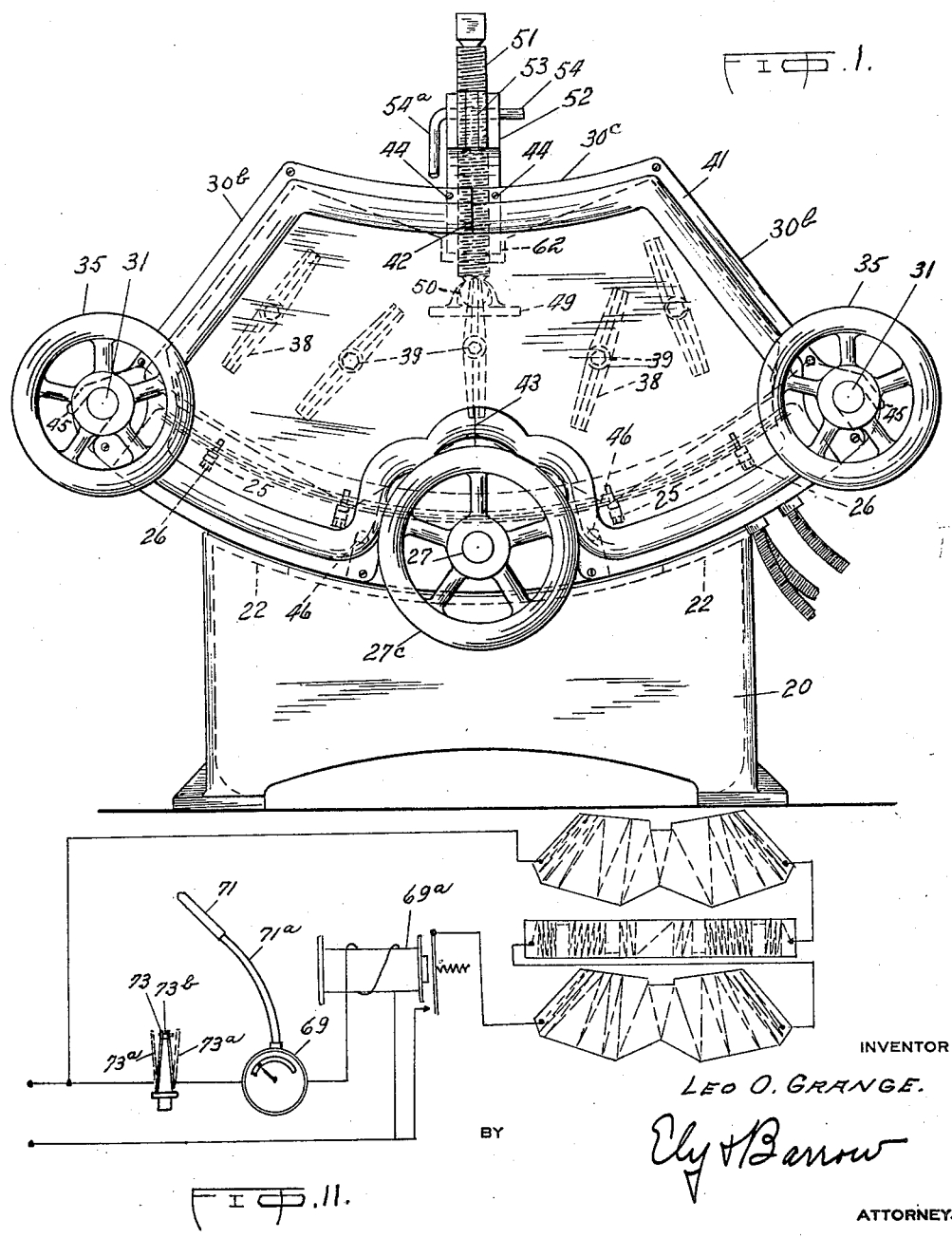
Figure 1 is one side elevation of a tire repair vulcanizer embodying the invention.
Figure 11 is a wiring diagram for the vulcanizer.

Referring to the drawings, the numeral 20 designates a suitable base or stand preferably in the form of a rectangular frame casting having side flanges 21, 21 and end flanges 22, 22 at its top shaped to provide an arcuate support (Figures 1, 2 and 5). On the base 20 there is secured a central bottom plate or mold member 23 of arcuate shape, preferably having a transversely flat and longitudinally cylindrical upper surface. The mold plate 23 (see Figure 6) is formed with a hollowed-out portion 23$^a$ in the bottom periphery thereof in which is received the heating element 24, the surface 23$^b$ of the hollowed-out portion or cavity 23$^a$ being substantially parallel to the upper surface of member 23 and being substantially flat transversely so that the flat heating element 24 may be urged into intimate contact with the surface 23$^b$ by means of the clamps 25 on bolts 26 threaded radially into the mold wall of member 23. The member 23 is strengthened at its bottom periphery by cross members 23$^c$ formed thereon and the cavity 23$^a$ preferably is enclosed by a bottom plate 23$^d$ secured thereto as by screws or the like. The cavity 23$^a$ is preferably filled with loose insulation, such as asbestos fibre, retained therein by plate 23$^d$, as indicated in the drawings.

At its center (see Figure 5), the bottom mold member or plate 23 is formed with a transverse member 23$^e$ providing a sufficient mass of metal to be bored as at 26 to receive a shaft 27 which may be journaled therein and prevented from shifting endwise by suitable means, such as key 28 engaged in a groove 29 in said shaft, key 28 being preferably formed on the end of a screw or the like threaded in member 23 as shown.

The shaft 27 extends through side mold plate members 30, 30. These are slidably mounted on the bottom member 23 by means of rods 31, 31 slidable in bores through the ends of the bottom mold member, these rods being secured to one side plate 30 as at 32, 32 and having threaded ends 33, 33 for the reception of nuts 34, 34 operable by hand wheels 35, 35 for holding the plates 30, 30 together against the pressure in the mold. The shaft 27 has reversely threaded portions 27$^a$ and 27$^b$ thereon (Figure 5) which are threaded through the bores in side plates 30 to move these toward or from each other to adjust the mold. Shaft 27 may be rotated by a hand wheel 27$^c$.

The side mold plates 30 are formed with arcuate bottom edges 30$^a$, 30$^a$ corresponding to the curvature of the bottom plate 23 and these, as shown in Figure 5, are designed to clear the base 10 so that the side plates may move freely, being supported solely by the rods 31 on the bottom plate. The end edges 30$^b$, 30$^b$ of the side plates 30 are substantially radial and the top edges 30$^c$, 30$^c$ arcuate so that the side plates 30, in cooperation with the bottom plate 23, are adapted to define a trough-shaped cavity in which a section of a tire may be vulcanized as will be understood by skilled artisans.

The plates 30 are hollowed out on their outer faces, as at 36, 36, to receive heating units 37, 37, the surfaces 36$^a$, 36$^a$ being made substantially flat so that the heating elements may be clamped into intimate contact with such surfaces by clamps 38, 38 which may be urged against the elements 37 by bolts 39, 39 threaded into members 30. The hollowed-out portions or cavities 36 may be covered by plates 40, 40 secured, as by screws 40$^a$, to a pair of members 41, 41 abutting at 42 and 43, these in turn being secured as by screws 44, 44 to the perimeters of members 30. The cavities 36 in the side plates are also preferably filled with asbestos or like insulating fibre.

It will be understood that plates 30 may be adjusted into abutment with the opposite side of tire molding inserts to be described which are mounted on plate 23, various sizes of inserts providing various sizes of molds, the parts of which are clamped together by the side plates. When the trough provided by plate 23 and plates 30 is adjusted with the latter spaced from the sides of the former, pairs of heat conductor segments 45, 45 of various widths (see Figure 7) are preferably inserted between the bottoms and sides of the vulcanizer. The segments 45 are of arcuate shape to correspond to the bottom of the vulcanizer and have hook formations 45$^a$ thereon for supporting the segments at their outer ends over rods 31. Shoulders 45$^b$ are formed on the inner ends of the heat conductor segments to rest on pins or studs 46, 46 secured on the sides of bottom mold member 23, these pins registering with sockets 46$^a$, 46$^a$ in the side plates 30.

As shown in Figure 5, the present vulcanizing equipment may be provided with sets of tread plates 47, 47 and bead plates 48, 48 for adapting the vulcanizer to ranges of tire sizes, the bottom surfaces of plates 47 corresponding to the upper surface of bottom plate 23 and the upper surfaces of the tread plate corresponding substantially to the tread of the tire T being vulcanized. In a like manner, the bead plates vary in curvature with various bead diameters or limited ranges of bead diameters of tires of various sizes. Spacers (not shown) may be used between both the tread and bead plates to accommodate tires of different sections having the same bead diameters. The usual air or pressure bag for expanding the tire against the mold surfaces is shown at B.

Figures 3, 4:
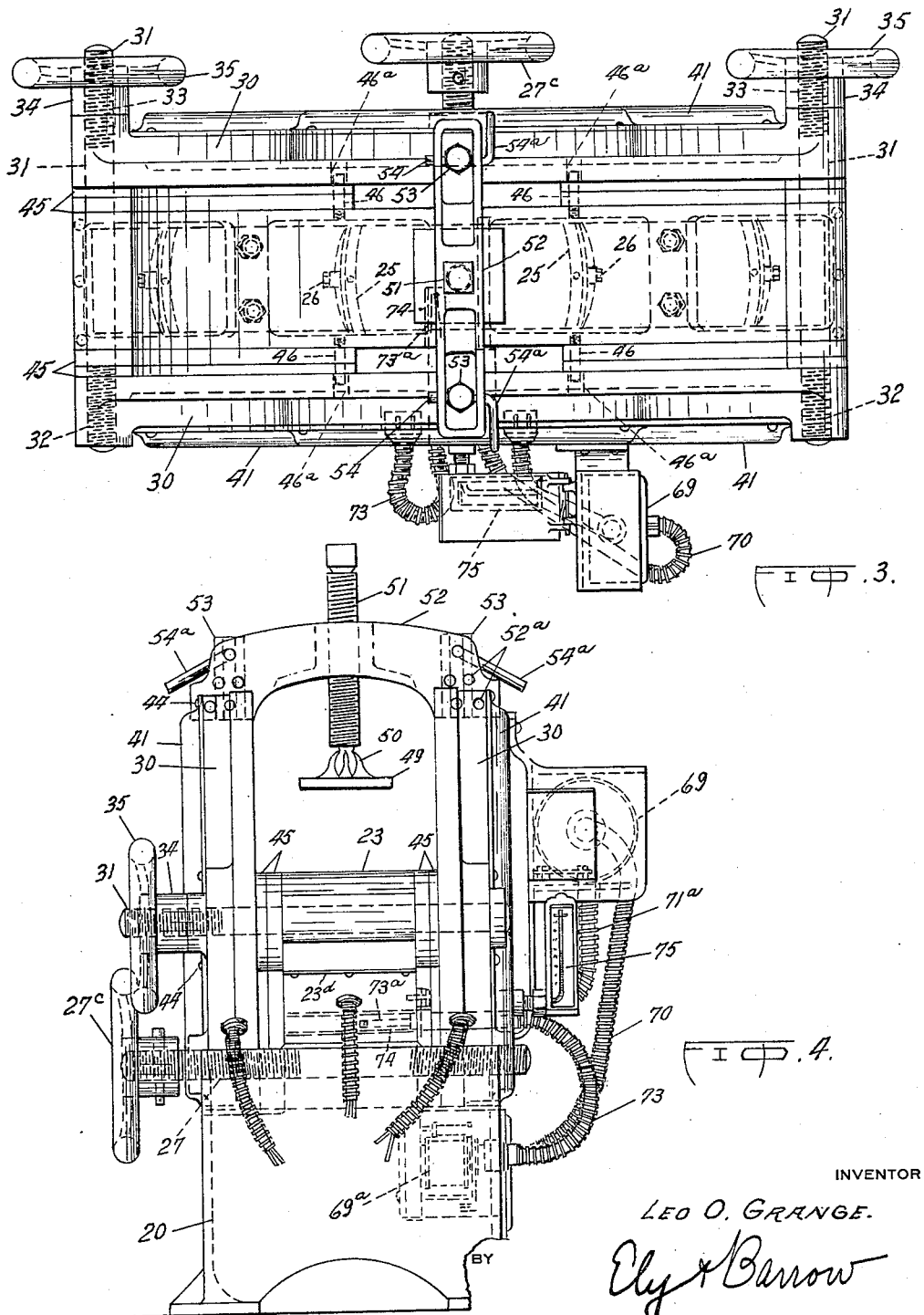
Figure 3 is a plan thereof.
Figure 4 is a left end elevation thereof as shown in Figure 3.

To apply radial pressure upon the bead plates 48 to hold the tire and assembled bead and tread plates in proper position in the mold during the cure, one or more presser elements 49 may be provided, these preferably having a ball and socket connection 50 with rods 51 threaded through clamp members 52. Rod 51 may have a polygonal head 51ª for turning the rod by the use of a wrench (not shown). Clamps 52 are adapted to span mold plates 30 and in order to permit mounting of clamps 52 on the plates 30 in their various adjusted positions, studs 53 are secured in the tops of mold plates 30 and provided with upper and lower apertures 53ª and clamp members 52 are formed with slots 52ª to be engaged over studs 53 and the clamps are provided with a plurality of differently positioned apertures 52ª (see Figures 3 and 5) through the slotted portions whereby the clamps 52 may be secured upon studs 53 as may be required for different widths to which plates 30 are adjusted and heights at which bead plates 48 must be held by means of pins 54 insertable through registering apertures in the clamps and studs. Pins 54 may be formed with bent portions providing handles 54ª. By this means a large number of clamping positions are secured.

The heating elements for the mold members are preferably constructed as illustrated in the magnified section through a typical element as shown in Figure 10. The heating element proper comprises a laminated structure including a thin central sheet 55 of mica or the like, on which is wound flat resistance wire 56, the wire being covered by outer sheets 57 and 58 also of mica or the like. The heating element is backed by a sheet of insulation 59 such as sheet asbestos and a pressure plate 60 is associated therewith to take and distribute the pressure of the clamps 25 or 38 so that the heating elements will be held in intimate contact with the mold walls to be heated. As shown in Figures 8 and 9, the edges of the central sheets 55 may be notched as at 55ª, 55ª and the convolutions of the resistance wire retained in the desired relative positions in the heating element by being engaged in said notches.

Figure 8 illustrates a heating element as designed for the side plates 30. This element is generally of the same shape as the plate, being notched as at 61 to clear the boss of metal 62 (Figure 5) into which studs 53 are threaded, having its corners cut away at 63, 63 to clear the metal formations about rods 31 and being notched as at 64 to clear the mass of metal about the adjusting screw shaft 27. It will be observed that at the ends of the side elements, the convolutions or stretches of the resistance wire are concentrated as at 65, 65 to compensate for dissipation of heat from the ends of plates 30, and that at the center, as at 66, the spacing of the resistance wire is wider than in the intermediate portion between the ends and the center to avoid production of excessive heat in the central portion of the vulcanizer. Also the convolutions are spaced closer at the top of the element than at the bottom. This provides for sufficient curing heat at the bead plates where some of the heat is dissipated upwardly from the tops of the side plates and the bead plates, and avoids excessive heat at the bottom of the vulcanizer where the heating elements for the sides and bottom of the vulcanizer cooperate to heat the tread plates.

In the bottom heating element as shown in Figure 9, the wiring is also concentrated at the ends as at 67 to compensate for dissipation of heat from the ends of the vulcanizer and the stretches of wiring are very widely spaced at the center, as at 68, to avoid excessive heat at the central bottom portion of the vulcanizer.

It was found that the central bottom portion of the vulcanizer is the most desirable position in which to place the vulcanizer adjustment screw since wherever this is placed a certain amount of heat must of necessity be dissipated and due to the fact that the tire acts as an effective insulator of heat, the tendency is for the vulcanizer to heat excessively at the central bottom portion thereof. Consequently the location of the adjusting means at this point aids in equalizing the curing temperature and does not require the concentration of wiring about it such as would be required were it located elsewhere.

To control the heat in the vulcanizer, a thermostatic device 69 is associated therewith, electrical connection to this device being made through leads in a flexible connector 70 and the temperature responsive element 71 thereof preferably being mounted in a bore 72 in the bottom plate 23 above the heating element adjacent the center of the vulcanizer (Figure 5), the element 71 being connected by a conductor in a suitable flexible connector 71ª to the control device 69. The control device 69 preferably operates to make and break the power circuit in the vulcanizer through a suitable relay 69ª.

To prevent injury to the vulcanizer or work by reason of failure of the thermostat to function, a circuit breaking device 73 may be associated with the vulcanizer preferably by inserting it into a bore 74 above the heating element in the bottom plate 23 adjacent the center of the vulcanizer. As shown in Figure 11, the device 73 preferably comprises a pair of springy elements 73ª in the power circuit mounted on a support so as normally to be apart as shown in dotted lines, but held together to complete the circuit through the device by a small mass of metal or other suitable material 73ᵇ adapted to fuse and allow said elements to break the circuit if the temperature in the vulcanizer becomes excessive.

As a further safeguard to the vulcanizer and the work therein, the several heating elements employed are arranged in series in the power circuit so that if one element should burn out for any reason, the circuit would be broken independently of the thermostatic device and the heat controlled circuit breaker. The wiring of the vulcanizer and its control equipment is illustrated diagrammatically in Figure 11.

A thermometer 75 may be associated with the vulcanizer, the bulb of which 75$^a$ may be housed in a bore in one side plate 30.

In use it will be apparent that the vulcanizer is easily adjustable for different sizes of tires by loosening the handwheels 35 and operation of handwheel 27$^c$, heat conductor segments 45 of the desired thickness being used between the side plates and the bottom plate for tires wider than the minimum size to which the vulcanizer is adapted, the mold sides being tightened against the heat conductor segments by the screw shaft 27 and being secured against spreading after adjustment by tightening wheels 35.

The desired tread plates are first inserted in the mold, then the tire containing the pressure bag, and finally the bead plates.

The clamp 52 may then be placed over the studs 53 and adjusted as to height and secured upon the studs in the adjusted positions of the side members 30, and screw 51 is actuated to press member 49 upon the bead plates to hold the tire in proper position in the mold and against the expansion of the pressure bag into which fluid under pressure is then introduced.

The vulcanizer is usually at vulcanizing temperature when the tire is introduced and it quickly recovers its vulcanizing temperature after being cooled by the tire, this temperature being maintained by the thermostatic control device 69 throughout the required curing period.

After vulcanization, removal of the tire may be facilitated after the usual operations of relieving the pressure in the bag B and releasing and removing the clamps 52 by first loosening handwheels 35 and moving the side plates 30 further apart.

It will be apparent that some of the features of the invention, particularly as to the construction of the heating elements with relation to the mold members, may be employed both in rigid, non-adjusting, sectional repair vulcanizers or in full-circle tire molds either for original vulcanization or repair, and some of the appended claims are of a scope to cover such application of these features to other types of vulcanizers. It will also be apparent that modifications of the invention may be resorted to without departing from the spirit thereof or the scope of the appended claims. For example, the vulcanizer is adapted for the use of any of the various types of cores in the tire instead of the air bag B, pressure being applied to the core where required by clamp 52.

What is claimed is:

1. A tire vulcanizing mold comprising a central arcuate bottom member and cooperating side members adapted to provide a trough to receive a section of a tire to be vulcanized, and means for heating each of said mold members comprising an electrical resistance element adjacent the wall of each member including stretches of resistance wires, the stretches of said wires being comparatively concentrated on each side member at the ends thereof and along the tops thereof and comparatively widely spaced at the centers and along the bottoms thereof adjacent the bottom member and the stretches of wires in said bottom member also being comparatively concentrated at the ends thereof and comparatively widely spaced at the center thereof whereby a substantially uniform vulcanizing temperature may be maintained throughout the vulcanizer.

2. A tire vulcanizing mold comprising a central arcuate bottom member and cooperating side members adapted to provide a trough to receive a section of a tire to be vulcanized, and means for heating each of said mold members comprising an electrical resistance element adjacent the wall of each member including stretches of resistance wires, the stretches of said wires being comparatively concentrated on each side member at the ends thereof and along the tops thereof and comparatively widely spaced at the centers and along the bottom thereof adjacent the bottom member and the stretches of wires in said bottom member also being comparatively concentrated at the ends thereof and comparatively widely spaced at the center thereof whereby a substantially uniform vulcanizing temperature may be maintained throughout the vulcanizer, said central member and said side members being separable, said side members being adjustable toward and from the opposite sides of the central member.

3. A tire vulcanizing mold comprising a central arcuate bottom member and cooperating side members adapted to provide a trough to receive a section of a tire to be vulcanized, and means for heating each of said mold members comprising an electrical resistance element adjacent the wall of each member including stretches of resistance wires, the stretches of said wires being comparatively concentrated on each side member at the ends thereof and along the tops thereof and comparatively widely spaced at the centers and along the bottom thereof adjacent the bottom member and the stretches of wires in said bottom member also being comparatively concentrated at the ends thereof and comparatively widely spaced at the center thereof whereby a substantially uniform vulcanizing temperature may be maintained throughout the vulcanizer, said central member and said side members being separable, said side members being adjustable toward and from the opposite sides of the central member, and means for simultaneously adjusting said side members.

4. A tire vulcanizing mold comprising a central arcuate bottom member and cooperating side members adapted to provide a trough to receive a section of a tire to be vulcanized, and means for heating each of said mold members comprising an electrical resistance element adjacent the wall of each member including stretches of resistance wires, the stretches of said wires being comparatively concentrated on each side member at the ends thereof and along the tops thereof and comparatively widely spaced at the centers and along the bottom thereof adjacent the bottom member and the stretches of wires in said bottom member also being comparatively concentrated at the ends thereof and comparatively widely spaced at the center thereof whereby a substantially uniform vulcanizing temperature may be maintained throughout the vulcanizer, said central member and said side members being separable, said side members being adjustable toward and from the opposite sides of the central member, and means for simultaneously adjusting said side members, said means comprising a shaft journaled in the central portion of the bottom member and having reversely threaded portions threaded through the side members.

5. A tire vulcanizing mold comprising a central arcuate bottom member and cooperating side members adapted to provide a trough to receive a section of a tire to be vulcanized, means for heating each of said mold members comprising an electrical resistance element adjacent the wall of each member including stretches of resistance wires, the stretches of said wires being comparatively concentrated on each side member at the ends thereof and along the tops thereof and comparatively widely spaced at the centers and along the bottom thereof adjacent the bottom member and the stretches of wires in said bottom member also being comparatively concentrated at the ends thereof and comparatively widely spaced at the center thereof whereby a substantially uniform vulcanizing temperature may be maintained throughout the vulcanizer, said central member and said side members being separable, said side members being adjustable toward and from the opposite sides of the central member, and heat conductor segments adapted to be fitted between the central bottom member and the side members when the latter are adjusted to positions spaced from the central member.

6. A tire vulcanizing mold comprising a central arcuate bottom member and cooperating side members adapted to provide a trough to receive a section of a tire to be vulcanized, means for heating each of said mold members comprising an electrical resistance element adjacent the wall of each member including stretches of resistance wires, the stretches of said wires being comparatively concentrated on each side member at the ends thereof and along the tops thereof and comparatively widely spaced at the centers and along the bottoms thereof adjacent the bottom member and the stretches of wires in said bottom member also being comparatively concentrated at the ends thereof and comparatively widely spaced at the center thereof whereby a substantially uniform vulcanizing temperature may be maintained throughout the vulcanizer, said central member and the side members being separable, means comprising rods in the ends of the central member for slidably supporting the side members on the central member, means associated with the ends of the side members to hold them against spreading from adjusted positions, means comprising a shaft in the center of the bottom member and having reversely threaded screw portions threaded through the side members for simultaneously adjusting the side members toward and from the central member, heat conductor segments adapted to be fitted between the central member and side members when adjusted apart, said segments having hook members for engaging over said rods at the ends of the vulcanizer, and studs on the central member for supporting said segments adjacent the center of the vulcanizer.

7. A tire vulcanizing mold comprising a central arcuate bottom member and cooperating side members adapted to provide a trough to receive a section of a tire to be vulcanized, means for heating each of said mold members comprising an electrical resistance element adjacent the wall of each member including stretches of resistance wires, the stretches of said wires being comparatively concentrated on each side member at the ends thereof and along the tops thereof and comparatively widely spaced at the centers and along the bottoms thereof adjacent the bottom member and the stretches of wires in said bottom member also being comparatively concentrated at the ends thereof and comparatively widely spaced at the center thereof whereby a substantially uniform vulcanizing temperature may be maintained throughout the vulcanizer, said central member and the side members being separable, means comprising rods in the ends of the central member for slidably supporting the side members on the central member, means comprising a shaft in the center of the bottom member and having reversely threaded screw portions threaded through the side members for simultaneously adjusting the side members toward and from the central member, heat conductor segments adapted to be fitted between the central member and side members when adjusted apart, said segments having hook members for engaging over said rods at the ends of the vulcanizer, and studs on the central member for supporting said segments adjacent the center of the vulcanizer.

8. A tire vulcanizing mold comprising a central arcuate bottom member and cooperating side members adapted to provide a trough to receive a section of a tire to be vulcanized, means for heating each of said mold members comprising an electrical resistance element adjacent the wall of each member including stretches of resistance wires, the stretches of said wires being comparatively concentrated on each side member at the ends thereof and along the tops thereof and comparatively widely spaced at the centers and along the bottoms thereof adjacent the bottom member and the stretches of wires in said bottom member also being comparatively concentrated at the ends thereof and comparatively widely spaced at the center thereof whereby a substantially uniform vulcanizing temperature may be maintained throughout the vulcanizer, said central member and the side members being separable, means comprising rods in the ends of the central member for slidably supporting the side members on the central member, means associated with the ends of the side members to hold them against spreading from adjusted positions, means comprising a shaft in the center of the bottom member and having reversely threaded screw portions threaded through the side members for simultaneously adjusting the side members toward and from the central member, and heat conductor segments adapted to be fitted between the central member and side members when adjusted apart.

9. A tire vulcanizing mold comprising a central arcuate bottom member and cooperating side members adapted to provide a trough to receive a section of a tire to be vulcanized, means for heating each of said mold members comprising an electrical resistance element adjacent the wall of each member including stretches of resistance wires, the stretches of said wires being comparatively concentrated on each side member at the ends thereof and along the tops thereof and comparatively widely spaced at the centers and along the bottoms thereof adjacent the bottom member and the stretches of wires in said bottom member also being comparatively concentrated at the ends thereof and comparatively widely spaced at the center thereof whereby a substantially uniform vulcanizing temperature may be maintained throughout the vulcanizer, said central member and the side members being separable, means comprising rods in the ends of the central member for slidably supporting the side members on the central member, means comprising a shaft in the center of the bottom member and having reversely threaded screw portions threaded through the side members for simultaneously adjusting the side members toward and from the central member, and heat conductor segments adapted to be fitted between the central member and side members when adjusted apart.

10. A tire vulcanizing mold comprising a central arcuate bottom member and cooperating side members adapted to provide a trough to receive a section of a tire to be vulcanized, means for heating each of said mold members comprising an electrical resistance element adjacent the wall of each member including stretches of resistance wires, the stretches of said wires being comparatively concentrated on each side member at the ends thereof and along the tops thereof and comparatively widely spaced at the centers and along the bottoms thereof adjacent the bottom member and the stretches of wires in said bottom member also being comparatively concentrated at the ends thereof and comparatively widely spaced at the center thereof whereby a substantially uniform vulcanizing temperature may be maintained throughout the vulcanizer, said central member and the side members being separable, means for slidably supporting the side members on the central member, means comprising a shaft in the center of the bottom member and having reversely threaded screw portions threaded through the side members for simultaneously adjusting the side members toward and from the central member, and heat conductor segments adapted to be fitted between the central member and side members when adjusted apart.

11. A tire vulcanizing mold comprising a central arcuate bottom member and cooperating side members adapted to provide a trough to receive a section of a tire to be vulcanized, means for heating each of said mold members comprising an electrical resistance element adjacent the wall of each member including stretches of resistance wires, the stretches of said wires being comparatively concentrated on each side member at the ends thereof and along the tops thereof and comparatively widely spaced at the centers and along the bottoms thereof adjacent the bottom member and the stretches of wires in said bottom member also being comparatively concentrated at the ends thereof and comparatively widely spaced at the center thereof whereby a substantially uniform vulcanizing temperature may be maintained throughout the vulcanizer, said central member and the side members being separable, means comprising rods in the ends of the central member for slidably supporting the side members on the central member, means for simultaneously adjusting the side members toward and from the central member, heat conductor segments adapted to be fitted between the central member and side members when adjusted apart, said segments having hook members for engaging over said rods at the ends of the vulcanizer, and studs on the central member for supporting said segments adjacent the center of the vulcanizer.

12. A tire vulcanizing mold comprising a central arcuate bottom member and cooperating side members adapted to provide a trough to receive a section of a tire to be vulcanized, means for heating each of said mold members comprising an electrical resistance element adjacent the wall of each member including stretches of resistance wires, the stretches of said wires being comparatively concentrated on each side member at the ends thereof and along the tops thereof and comparatively widely spaced at the centers and along the bottoms thereof adjacent the bottom member and the stretches of wires in said bottom member also being comparatively concentrated at the ends thereof and comparatively widely spaced at the center thereof whereby a substantially uniform vulcanizing temperature may be maintained throughout the vulcanizer, said central member and the side members being separable, means comprising rods in the ends of the central member for slidably supporting the side members on the central member, means for simultaneously adjusting the side members toward and from the central member, and heat conductor segments adapted to be fitted between the central member and side members when adjusted apart.

13. A tire vulcanizing mold comprising a central arcuate bottom member and cooperating side members adapted to provide a trough to receive a section of a tire to be vulcanized, means for heating each of said mold members comprising an electrical resistance element adjacent the wall of each member including stretches of resistance wires, the stretches of said wires being comparatively concentrated on each side member at the ends thereof and along the tops thereof and comparatively widely spaced at the centers and along the bottoms thereof adjacent the bottom member and the stretches of wires in said bottom member also being comparatively concentrated at the ends thereof and comparatively widely spaced at the center thereof whereby a substantially uniform vulcanizing temperature may be maintained throughout the vulcanizer, said central member and the side members being separable, means for slidably supporting the side members on the central member, means for simultaneously adjusting the side members toward and from the central member, and heat conductor segments adapted to be fitted between the central member and side members when adjusted apart.

14. A tire vulcanizing mold comprising a central arcuate bottom member and cooperating side members adapted to provide a trough to receive a section of a tire to be vulcanized, means for heating each of said mold members comprising an electrical resistance element adjacent the wall of each member including stretches of resistance wires, the stretches of said wires being comparatively concentrated on each side member at the ends thereof and along the tops thereof and comparatively widely spaced at the centers and along the bottoms thereof adjacent the bottom member and the stretches of wires in said bottom member also being comparatively concentrated at the ends thereof and comparatively widely spaced at the center thereof whereby a substantially uniform vulcanizing temperature may be maintained throughout the vulcanizer, said central member and the side members being separable, means for slidably supporting the side members on the central member, and means comprising a shaft in the center of the bottom member and having reversely threaded screw portions threaded through the side members for simultaneously adjusting the side members toward and from the central member.

15. A tire vulcanizing mold comprising a central arcuate bottom member and cooperating side members adapted to provide a trough to receive a section of a tire to be vulcanized, means for heating each of said mold members comprising an electrical resistance element adjacent the wall of each member including stretches of resistance wires, the stretches of said wires being comparatively concentrated on each side member at the ends thereof and along the tops thereof and comparatively widely spaced at the centers and along the bottoms thereof adjacent the bottom member and the stretches of wires in said bottom member also being comparatively concentrated at the ends thereof and comparatively widely spaced at the center thereof whereby a substantially uniform vulcanizing temperature may be maintained throughout the vulcanizer, said central member and the side members being separable, means for slidably supporting the side members on the central member, and means for simultaneously adjusting the side members toward and from the central member.

16. A tire vulcanizing mold comprising a central member and two separable side members, and a single means attached to the central member and permanently connected with the side members for simultaneously adjusting the side members toward and from the central member.

17. A tire vulcanizing mold comprising a central member and two separable side members, and a single means attached to the central member and permanently connected with the side members for simultaneously adjusting the side members toward and from the central member, said means comprising a shaft journaled in the central member with reversely threaded portions threaded through the side members.

18. A tire vulcanizing mold comprising a central member and two separable side members, a single means for simultaneously adjusting the side members toward and from the central member, and heat conductor segments adapted to be fitted between the central member and the side members when adjusted to separated positions.

19. A tire repair vulcanizing mold comprising a central arcuate bottom member and side members movable toward and from the side edges of the central member to provide a tire-receiving trough adjustable as to width, said side members being slidably supported upon the central member by rods at the ends of the central member, means comprising nuts threaded on said rods for securing the side members to the central member to prevent spreading of the side members from an adjusted position, and means comprising a shaft journaled in the central member and having reversely threaded portions threaded through the side members for simultaneously adjusting the side members toward and from the central member.

20. A tire repair vulcanizing mold comprising a central arcuate bottom member and side members movable toward and from the side edges of the central member to provide a tire-receiving trough adjustable as to width, said side members being slidably supported upon the central member by rods at the ends of the central member, means for securing the side members to the central member to prevent spreading of the side members from an adjusted position, and means comprising a shaft journaled in the central member and having reversely threaded portions threaded through the side members for simultaneously adjusting the side members toward and from the central member.

21. A tire repair vulcanizing mold comprising a central circular bottom member and side members movable toward and from the side edges of the central member to provide a tire-receiving trough adjustable as to width, said side members being slidably supported upon the central member by rods at the ends of the central member, means for securing the side members to the central member to prevent spreading of the side members from an adjusted position, and means for simultaneously adjusting the side members toward and from the central member.

22. A tire repair vulcanizing mold comprising a central arcuate bottom member and side members movable toward and from the side edges of the central member to provide a tire-receiving trough adjustable as to width, means for securing the side members to the central member to prevent spreading of the side members from an adjusted position, and means comprising a shaft journaled in the central member and having reversely threaded portions threaded through the side members for simultaneously adjusting the side members toward and from the central member.

23. A tire repair vulcanizing mold comprising a central arcuate bottom member and side members movable toward and from the side edges of the central member to provide a tire-receiving trough adjustable as to width, means for securing the side members to the central member to prevent spreading of the side members from an adjusted position, and means for simultaneously adjusting the side members toward and from the central member.

LEO O. GRANGE.